United States Patent
Vice

(10) Patent No.: US 8,752,233 B2
(45) Date of Patent: Jun. 17, 2014

(54) APPARATUS AND METHOD FOR PICKING UP STICKERS IN GRASSY AND OTHER AREAS

(71) Applicant: Marilyn S. Vice, Midland, TX (US)

(72) Inventor: Marilyn S. Vice, Midland, TX (US)

(*) Notice: Subject to any disclaimer, the term of this patent is extended or adjusted under 35 U.S.C. 154(b) by 0 days.

(21) Appl. No.: 13/889,629

(22) Filed: May 8, 2013

(65) Prior Publication Data

US 2013/0239350 A1    Sep. 19, 2013

Related U.S. Application Data

(62) Division of application No. 13/316,850, filed on Dec. 12, 2011, now Pat. No. 8,449,683.

(60) Provisional application No. 61/421,773, filed on Dec. 10, 2010.

(51) Int. Cl.
  *B05C 17/02* (2006.01)
  *A47L 9/04* (2006.01)

(52) U.S. Cl.
  USPC ............................................. 15/230.11

(58) Field of Classification Search
  USPC ............... 15/104.002, 105, 208, 210.1, 230, 15/230.11, 244.3
  See application file for complete search history.

(56) References Cited

U.S. PATENT DOCUMENTS

| | | | |
|---|---|---|---|
| 3,177,512 A | 4/1965 | BaLabon | |
| 3,742,547 A | 7/1973 | Sohmer | |
| 3,986,226 A * | 10/1976 | Roe et al. | 15/230.11 |
| 4,356,584 A * | 11/1982 | Zamboni | 15/98 |
| 4,422,201 A | 12/1983 | McKay | |
| 4,727,616 A | 3/1988 | Kucera | |
| 5,878,457 A | 3/1999 | Cox | |
| 5,924,157 A | 7/1999 | Barela | |
| 6,449,794 B1 | 9/2002 | Jaffri | |
| 7,281,288 B1 | 10/2007 | McKay | |
| 2004/0205921 A1 * | 10/2004 | Woodruff et al. | 15/230.11 |
| 2006/0011216 A1 | 1/2006 | Potashnick | |
| 2006/0179596 A1 * | 8/2006 | Sharratt | 15/230.11 |
| 2007/0163062 A1 | 7/2007 | McKay | |
| 2007/0220691 A1 | 9/2007 | McKay | |
| 2008/0040874 A1 | 2/2008 | McKay | |
| 2009/0271938 A1 | 11/2009 | Yamaguchi | |

FOREIGN PATENT DOCUMENTS

DE    3721250    1/1989
GB    2233882    1/1991

* cited by examiner

*Primary Examiner* — Robert Scruggs
(74) *Attorney, Agent, or Firm* — Nixon & Vanderhye PC

(57) ABSTRACT

An apparatus and method for picking up stickers in grassy or other ground areas. A roller is rotatably mounted on a frame and a stretchable fabric is removably mounted and stretched on an outer surface of the roller. The fabric is of a construction and thickness to pick up stickers as the roller is moved by the frame and rotated in engagement with a grassy or other ground surface. When the fabric is full of stickers, it is removed from the roller and replaced with a new unused stretchable fabric that is removably mounted on the roller.

12 Claims, 8 Drawing Sheets

APPARATUS AND METHOD FOR PICKING UP STICKERS IN GRASSY AND OTHER AREAS

CROSS-REFERENCES TO RELATED APPLICATIONS

This application is a divisional application of U.S. patent application Ser. No. 13/316,850, filed on Dec. 12, 2011, which claims the priority of Provisional Patent Application No. 61/421773, filed on Dec. 10, 2010.

BACKGROUND OF THE INVENTION

1. Field of the Invention

The present invention relates to a method and apparatus for picking up stickers in grassy and other areas, and more particularly, to such an apparatus and method which uses a roller for picking up the stickers.

2. Description of the Background Art

In prairie states such as Texas, there are many stickers such as grass burrs or "goat heads" which can be very painful if stepped on by a person who is not wearing shoes or other protective footwear. Other than picking up such stickers by hand individually or in raked up bunches, which can be quite painful, there are no suitable devices for removing such stickers from grassy and other areas.

The device of the present invention is simple in construction, inexpensive to manufacture, reliable in operation and easy to use in conveniently picking up and disposing of such stickers from grassy and other areas.

BRIEF SUMMARY OF THE INVENTION

The apparatus of the present invention generally comprises a roller rotatably mounted on an elongated handle of any suitable construction. A stretchable fabric sleeve is removably mounted on the roller and is of a suitable thickness and made of a suitable material that will pick up stickers such as grass burrs or "goat heads" from grassy or other areas when the roller is rotatably moved over the surface of such areas. When the fabric sleeve accumulates sufficient stickers thereon, it is removed from the roller, disposed of and a new sleeve is positioned thereon. In this manner, stickers such as grass burrs or "goat heads" can be easily picked up from grassy or other areas without the necessity of handling them.

The roller may be made of any suitable material and the sleeve may be made of any suitable fabric, such as polyester, acrylic, burlap, cotton or a blend thereof. Preferably, the fabric sleeve is of sufficient thickness to be penetrated by stickers that are engaged by the roller such that the stickers are retained on the fabric sleeve and thus are removed from the grassy or other areas as the roller is rotatably moved along the surface thereof. Also, the material of the sleeve should be of a construction that enables it to be penetrated by the stickers when it engages them as the roller is moved along the ground surface.

DETAILED DESCRIPTION OF THE INVENTION

Figure 1:
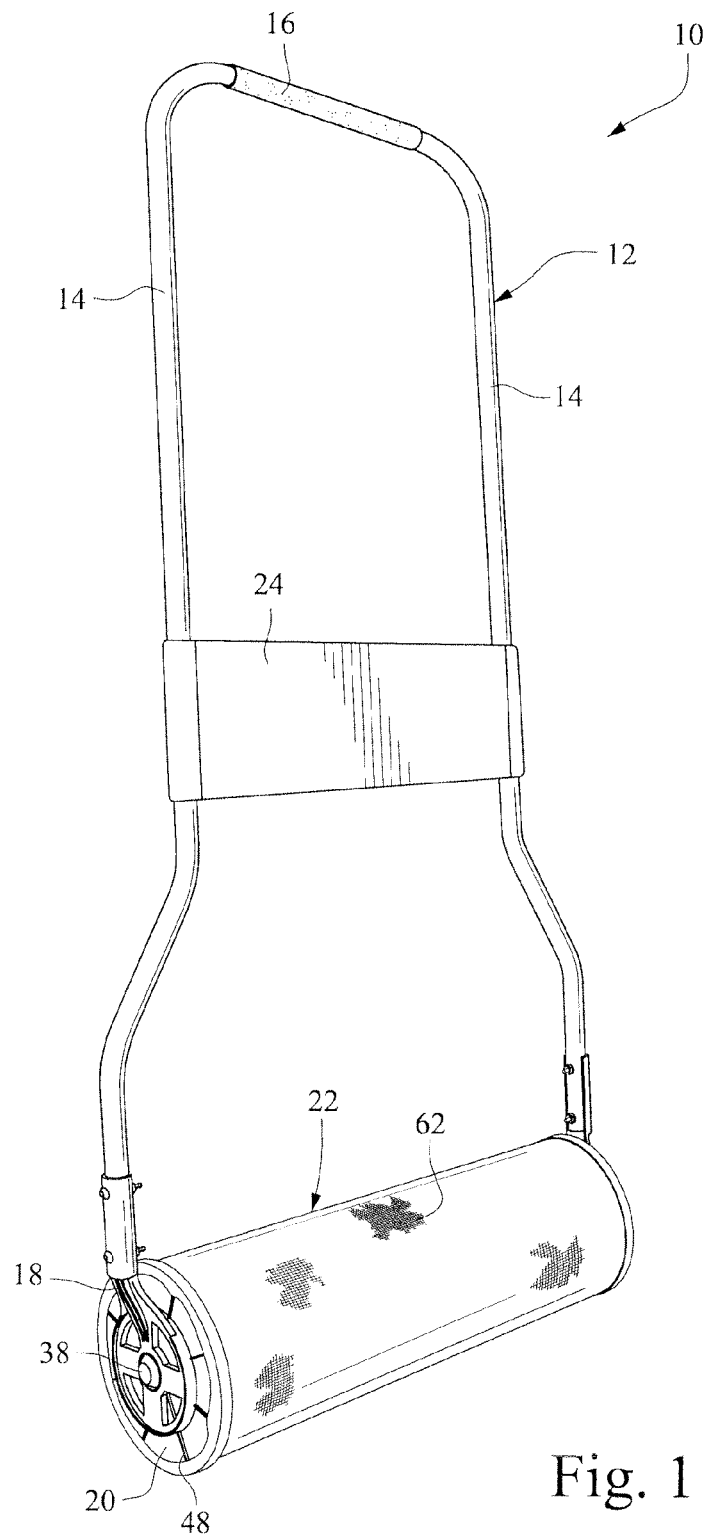
FIG. 1 is a perspective view of the front portion of a first embodiment of the apparatus of the present invention.

As shown in FIG. 1, a first embodiment of the apparatus 10 for picking up stickers in grassy and other ground areas comprises a frame 12 having laterally spaced elongated legs 14 that are connected at their upper ends by a handle portion 16. The lower end of each leg 14 extends laterally outwardly and downwardly and terminates in a connecting member 18 that is rotatably and releasably connected to the adjacent endplate 20 of a roller 22. The roller 22 is constructed to pick up stickers as it is rolled over grassy and other ground areas by pulling or pushing the handle portion 16 of the frame 12.

The frame 12 may be provided with a cross-brace 24 connected in any suitable manner to the legs 14. The cross brace 24 may have identifying or decorative indicia thereon.

Figure 2:
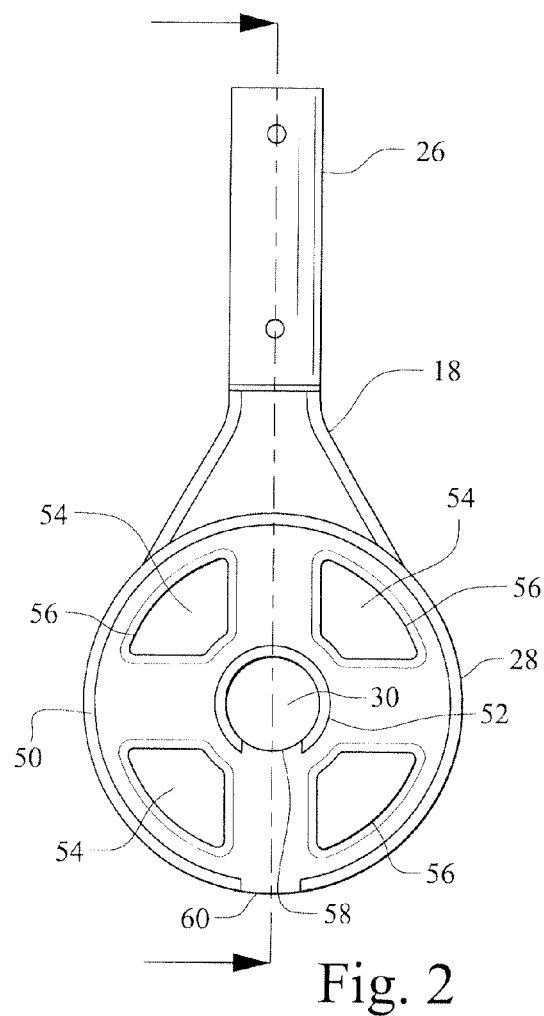
FIG. 2 is a front elevational view of the lower portion of the frame of the apparatus shown in FIG. 1.
Figure 3:
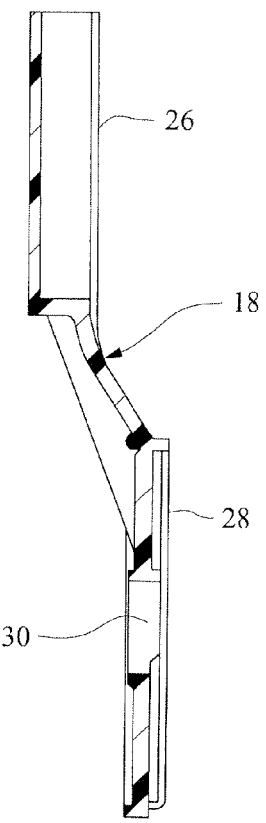
FIG. 3 is a side elevational view in section of the lower portion of the frame shown in FIG. 2.

Referring to FIGS. 2 and 3, each connecting member 18 at the lower end of a frame leg 14 comprises an upper bracket portion 26 that may be of semi-circular cross section and have apertures therethrough for securing the connecting member 18 to the lower end of an adjacent frame leg 14 by nuts and bolts or in any other suitable manner. Alternatively, the connecting member 18 may be formed integrally with the lower end of the frame leg 14.

The lower portion 28 of the connecting member 18 is of generally circular construction and is provided with a central opening 30 therethrough for enabling the connecting member 18 to be releasably and rotatably connected to the roller 22 in a manner more fully described hereinafter.

Figure 4:
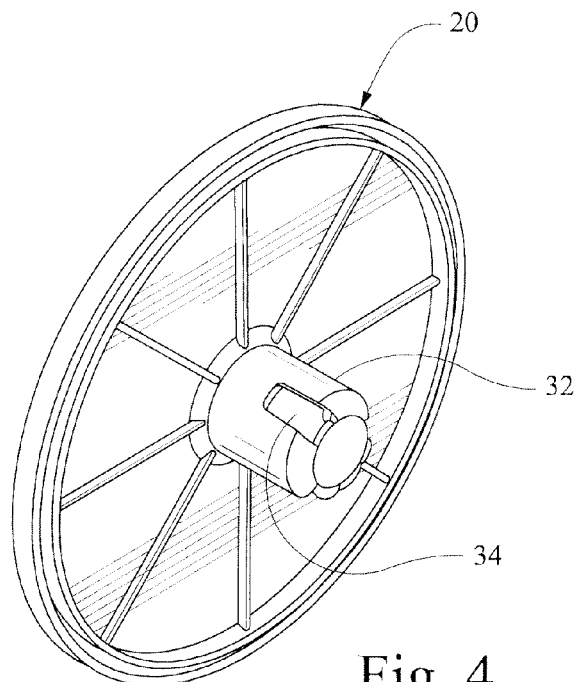
FIG. 4 is a perspective view of the inside portion of an endplate of the roller shown in FIG. 1.
Figure 6:
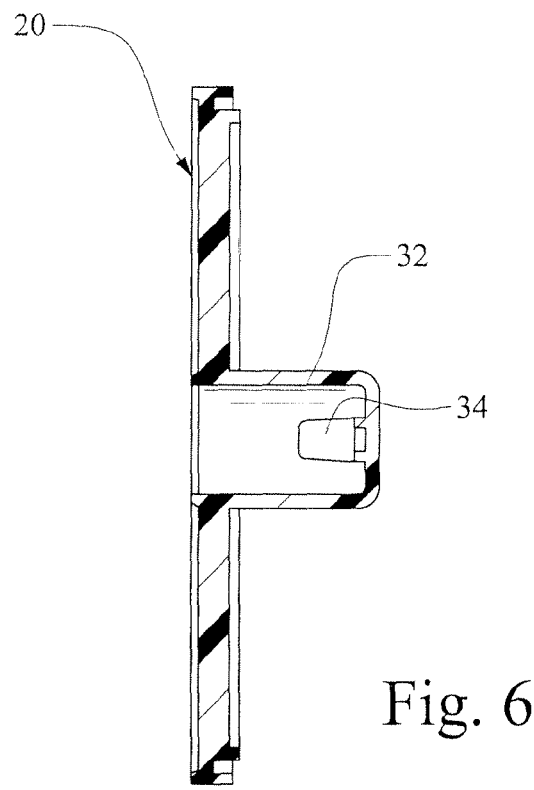
FIG. 6 is a side elevational view in section of the roller endplate shown in FIGS. 4 and 5.

As shown in FIGS. 4 and 6, each roller endplate 20 is of generally circular construction and comprises an inwardly extending, generally cylindrical central portion 32 that is closed at its inner end and comprises longitudinally extending slots 34 spaced around the periphery thereof.

Figure 7:
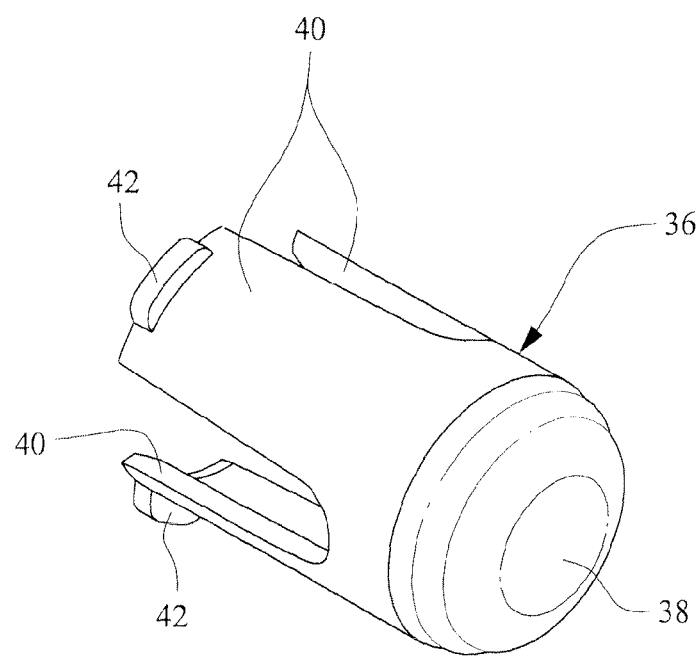
FIG. 7 is an enlarged perspective view of a mounting and release button that is received within the central portion of the roller endplate shown in FIGS. 4-6 for the releasable mounting of the roller on the frame shown in FIG. 1.
Figure 8:
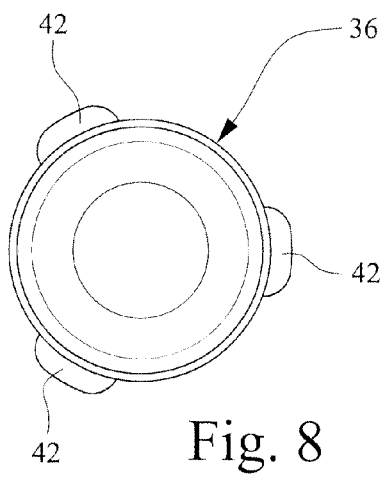
FIG. 8 is an end view of the mounting and release button shown in FIG. 6.

FIGS. 7 and 8 illustrate a mounting and release button 36 of generally cylindrical construction having a closed outer end 38 and inwardly extending, circumferentially spaced legs 40. Each leg 40 is of generally curved cross-section and has a radially outwardly extending tab 42 at its inner end.

Figure 9:
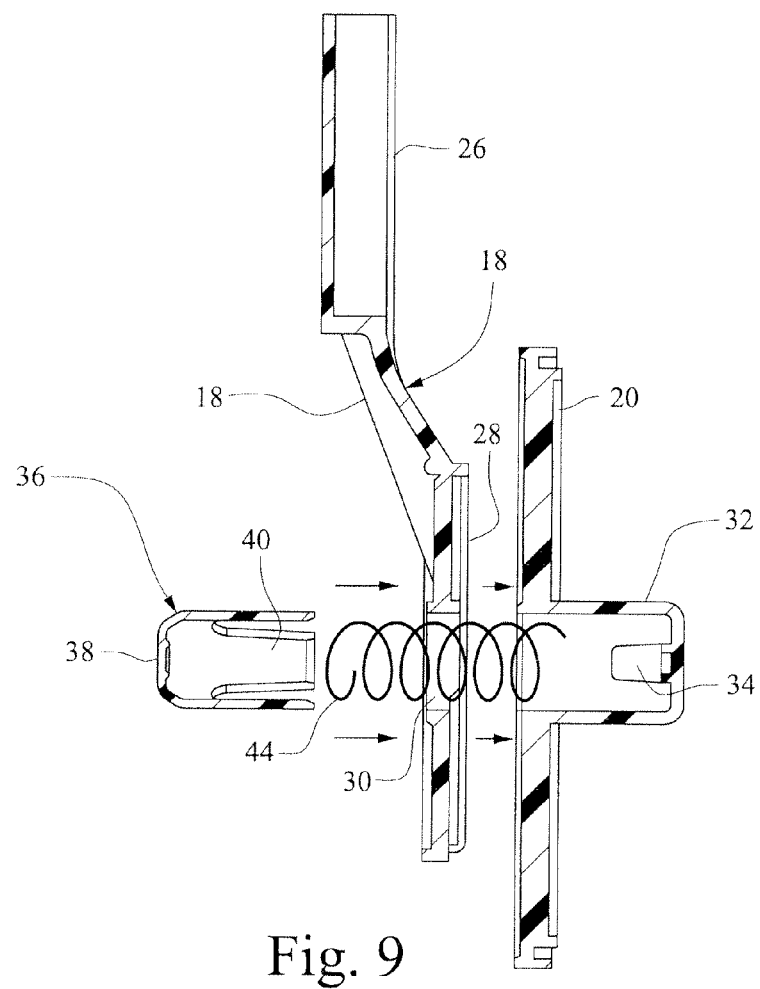
FIG. 9 is an exploded view in section of the mounting and release button shown in FIGS. 7 and 8, and the roller endplate shown in FIGS. 4-6.

As shown in FIG. 9, the button 36 is received within the inwardly extending portion 32 of the roller endplate 20 such that its flexible and resilient legs 40 urge the tabs 42 into sliding engagement within the slots 34. A spring 44 of any suitable construction is disposed between the closed inner end of the inwardly extending portion 32 of the roller endplate 18 and the outer closed end 38 of the button 36, thereby urging the button 36 to the outer position shown in FIG. 1 wherein the tabs 42 engage the outer ends of the slots 34 to retain the button within the inner portion 32 of the endplate 18.

When the button 36 is in the outer position shown in FIG. 1, it extends through the central opening 30 of the adjacent connecting member 18 at the lower end of the frame leg 14 to releasably and rotatably connect the roller 22 to the frame 12. When it is desired to remove the roller 22 from the frame 12, the outer end 38 of the button 36 is pushed inwardly so that the adjacent connecting member 18 may be removed from the roller endplate 20 to release the roller 22 from the frame 12.

Figure 5:
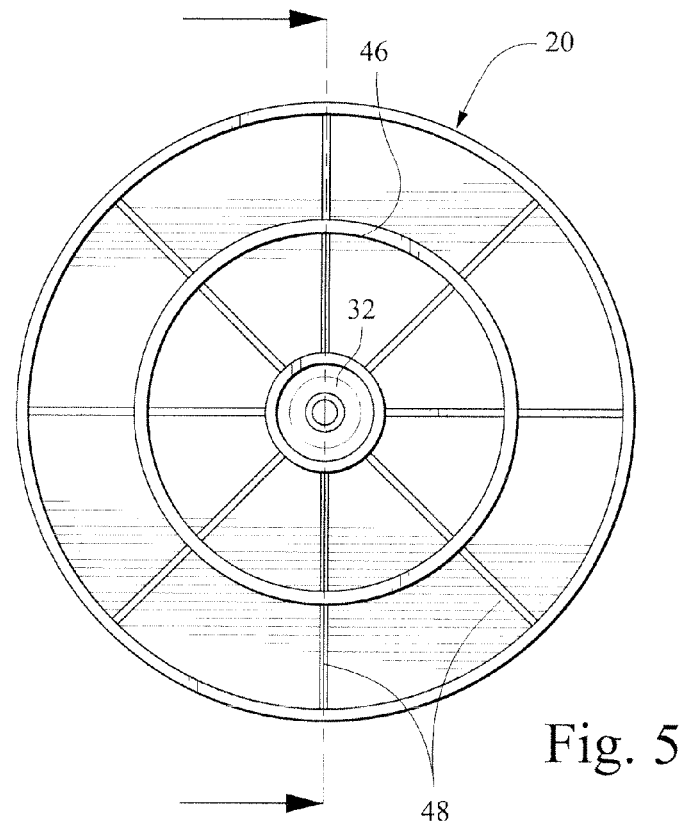
FIG. 5 is an elevational view of the outside position of the endplate shown in FIG. 4.

To facilitate the rotation of the roller 22 when it is mounted on the frame 12, the outer surface of each endplate 20 may be provided with a raised circular ridge 46 in the central portion thereof and radially outwardly extending ridges 48 of less depth than the circular ridge 46, as shown in FIG. 5. Each connecting member 18 of a frame leg 14 is provided on its inner surface with a raised ridge 50 extending around the periphery thereof and a raised ridge 52 extending around the central opening 30. Also, the lower circular end 28 of the connecting member 18 may be provided with spaced openings 54 that are surrounded by raised ridges 56.

As shown in FIG. 2, the raised ridge 52 surrounding the central opening 30 of the connecting member 18 may be interrupted at 58, and the raised ridge 50 on the periphery of the lower central portion 28 of the connecting member 18 may be interrupted at 60 to provide radially aligned openings that are slightly larger than the outer end 38 of the button 36 to facilitate the positioning of the connecting member 18 over the button 36. When the connecting member 18 is positioned over the button so that the outer end 38 of the button extends through the central opening 30, the circular ridge 46 on the outer surface of the roller endplate 20 is received within the circular ridge 50 on the periphery of the circular end portion 28 of the connecting member 18 to facilitate the proper positioning of the connecting member 18 on the roller endplate 20 and the relative rotation therebetween. In addition, the ridges 50, 52 and 56 of the connecting member 18 engage the radial ridges 48 on the outer surface of the roller endplate 20 to facilitate the rotation of the roller 22 on the frame 12 and to reduce the friction between each connecting member 18 and the adjacent roller endplate 20.

Figure 10:
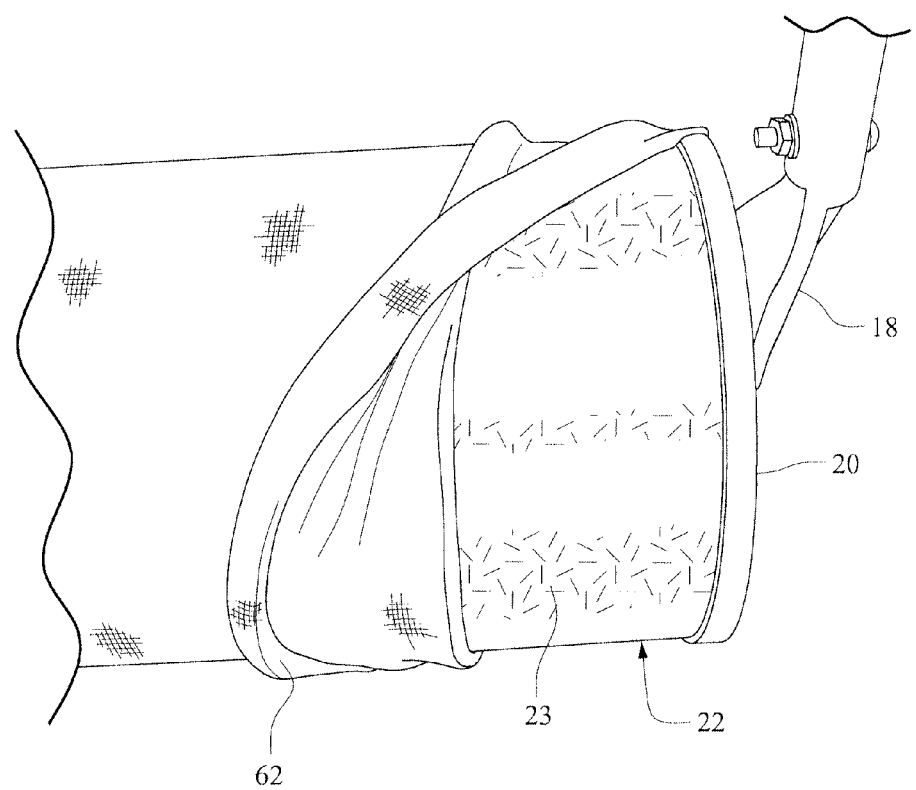
FIG. 10 is an enlarged perspective view of the roller shown in FIG. 1, with parts broken away.

Referring to FIGS. 1 and 10, the roller 22 may be formed of any suitable material, such as plastic or metal, and has a stretchable fabric sleeve 62 removably mounted thereon in any suitable manner. In one embodiment, the sleeve 62 is of tubular form and is positioned or stretched over the roller 22 so that its edges extend over the adjacent roller endplates 20.

In another embodiment, the sleeve 62 may be of initial flat configuration and then is stretched over the roller in a cylindrical configuration wherein its ends are removably connected in any suitable manner such as by Velcro or other securing devices.

The fabric sleeve 62 is of a suitable thickness and made of a suitable material that will pick up stickers such as grass burrs or "goat heads" from grassy or other ground areas when the roller is rotatably moved over the surface of such removed from the roller 22, disposed of and a new sleeve is positioned on the roller. In this manner, stickers such as grass burrs or "goat heads" can be easily picked up from grassy or other ground areas without the necessity of handling them. The fabric sleeve 62 may be made of any suitable fabric, such as polyester, acrylic, burlap, cotton or a blend thereof. The material of the sleeve 62 should be of a construction that enables it to be penetrated by the stickers when it engages them as the roller is moved along the ground surface.

As an illustrative example, the thickness of the sleeve fabric may be approximately 0.015-0.125 inches and the surface of the roller 22 may be formed of plastic, metal or the like and has roughened portions 23 thereon to reduce slippage of the fabric sleeve 62 on the roller.

Figure 11:
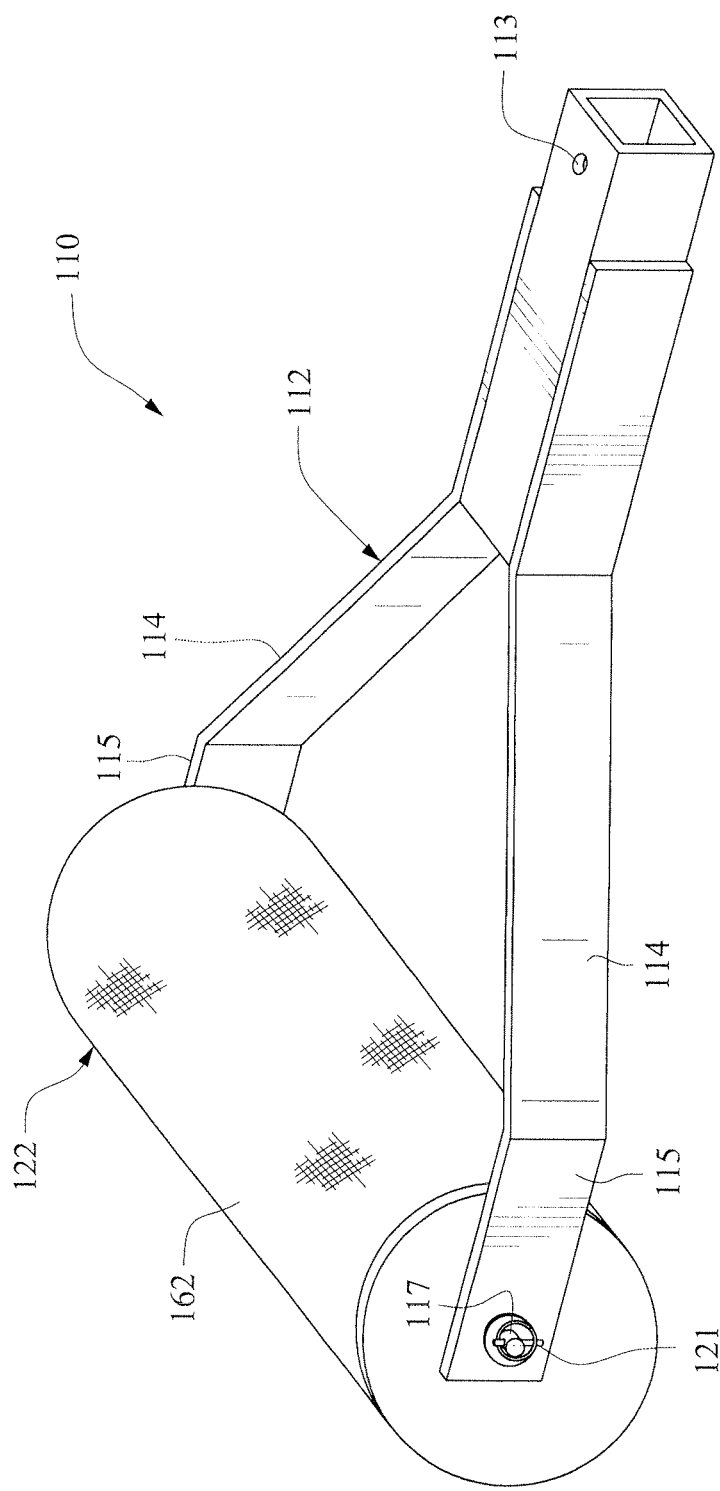
FIG. 11 is a perspective view of a second embodiment of the apparatus of the present invention that is constructed to be connected to a vehicle.
Figure 12:
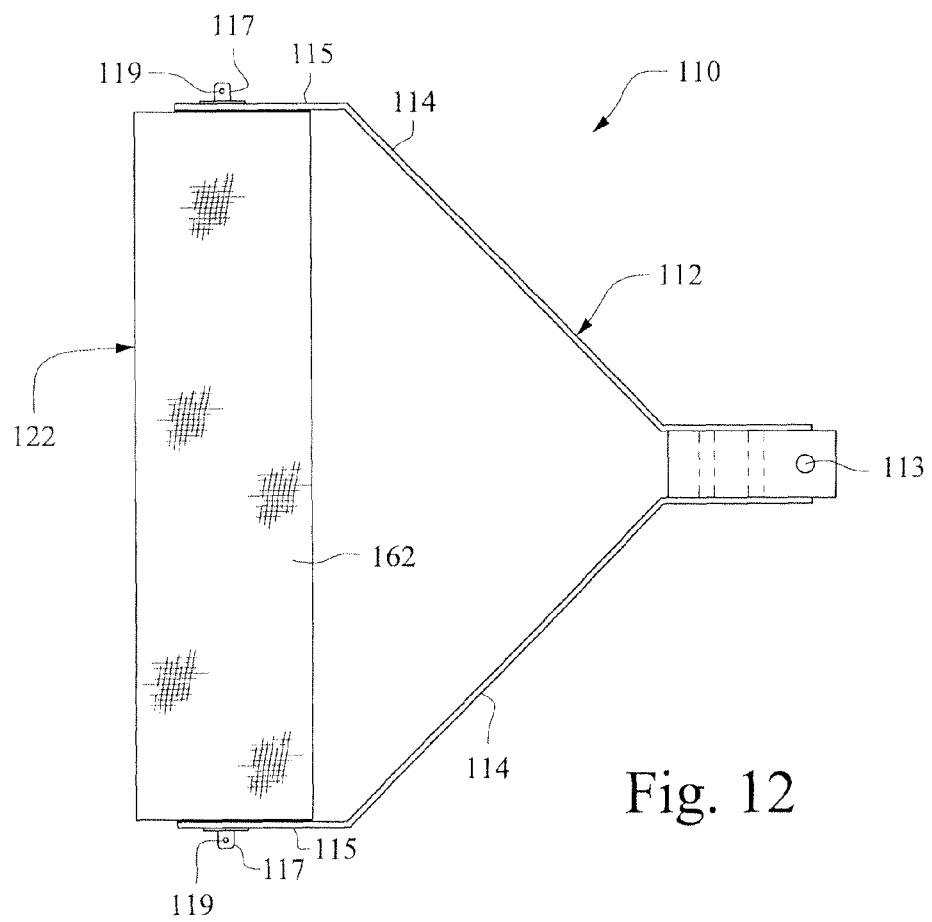
FIG. 12 is a top plan view of the apparatus shown in FIG. 11.

FIGS. 11 and 12 illustrate a modified embodiment of the apparatus 110 comprising a frame 112 having a front portion secured to a bracket 113 or the like which is constructed to be removably connected in any suitable manner to a vehicle for towing. The frame 112 comprises rearwardly extending and diverging legs 114 that are removably connected in any suitable manner, such as that shown in FIGS. 1-10, to a roller 122 having a stretchable fabric 162 removably mounted thereon. The roller 122 and fabric sleeve 162 may be of the same construction as the roller 22 and sleeve 62 described herein with respect to the embodiment shown in FIGS. 1-10.

For heavy duty applications, the legs 114 of the frame 112 may terminate rearwardly in parallel end sections 115 having aligned apertures through which an axle 117 extends for rotatably supporting the roller 122. The outer ends of the axle 117 may be provided with apertures 119 therethrough for receiving a locking pin 121 or the like for releasably securing the frame 112 to the roller 122.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. Apparatus for picking up stickers in grassy and other ground areas, comprising:
   a frame;
   a roller rotatably and removably mounted on the frame, and,
   wherein the frame has laterally spaced legs having end portions with connecting members that are removably connected to the roller,
   wherein each end portion connecting member has an opening therethrough, and the roller comprises an endplate adjacent to he end portion and having a button movably mounted therein and biased to an outer position wherein an outer closed end of the button extends through the opening in the end portion of the frame leg, and
   wherein the end portion connecting member is circular and the opening is in a center thereof, the endplate has an inwardly extending cylindrical portion with a closed inner end and longitudinal slots therethrough spaced around a periphery thereof, the button has inwardly extending circumferentially spaced flexible and resilient legs disposed within the endplate cylindrical portion with radially outwardly extending tabs on inner ends of the button legs that are slidably mounted within the slots and limit outward movement of the button relative to the endplate, and a spring is disposed between the closed inner end of the endplate cylindrical portion and the outer closed end of the button to urge the button to the outer position, whereby inward pressure on the outer end of the button moves it inwardly against the spring to facilitate the removal of the outer button end from the connecting member opening and the removal of the roller from the frame legs, and
   a stretchable fabric removably mounted and stretched on an outer surface of the roller and being of a construction and thickness to pick up stickers as the roller is moved by the frame and rotated in engagement with a grassy or other ground area.

2. The apparatus of claim 1 wherein the fabric is in the form of a sleeve that is stretched over the roller.

3. The apparatus of claim 1 wherein the fabric is in the form of a sheet that is rolled and stretched over the roller and thereafter end portions thereof are removably connected.

4. The apparatus of claim 1 wherein the outer surface of the roller has roughened portions to reduce slippage of the fabric thereon.

5. The apparatus of claim 1 wherein the fabric is polyester, acrylic, burlap, cotton or a blend thereof.

6. The apparatus of claim 1 wherein a thickness of the fabric is about 0.015 to 0.125 inches.

7. The apparatus of claim 1 wherein the endplate has a raised circular ridge on a midportion of an outer surface thereof, and the connecting member has a raised circular ridge on a periphery of an inner surface thereof, whereby the endplate ridge is received within the ridge on the connecting member of the frame leg to facilitate the mounting of the connecting member on the endplate and button, and the rotation of the endplate on the connecting member of the frame leg.

8. The apparatus of claim 7 wherein the outer surface of the endplate and the inner surface of the connecting member have raised areas in contact with each other to facilitate rotation of the endplate relative to the connecting member and reduce friction therebetween.

9. The apparatus of claim 8 wherein one of the raised areas is a ridge around the center opening of the connecting member which has a first interrupted area, and the ridge around the periphery of the connecting member has a second interrupted area in radial alignment with the first interrupted area, the first and second interrupted areas being larger than the outer button end to facilitate the movement of the connecting member onto and away from the button.

10. The apparatus of claim 1 wherein the connecting members of the legs have laterally aligned openings therethrough, an axle extends through the openings and is rotatable on the connecting members, the roller is mounted on the axle, the axle has end portions that extend outwardly from the connecting members and have apertures therethrough, and pins are removably mounted in the axle apertures to removably and rotatably connect the axle and the roller to the connecting members.

11. The apparatus of claim 10 wherein an end of the frame opposite to the connecting members is constructed to be attached to a vehicle for towing the frame and roller.

12. The apparatus of claim 1 wherein the legs are formed of metal, the connecting members are formed of plastic and are connected to the legs, the roller and endplates are formed of plastic, and the button is formed of plastic.

\* \* \* \* \*